US011327774B2

(12) United States Patent
Chatterjee et al.

(10) Patent No.: US 11,327,774 B2
(45) Date of Patent: May 10, 2022

(54) PERSONALIZATION OF RESOURCE STRINGS IN A COMPUTING DEVICE

(71) Applicant: Microsoft Technology Licensing, LLC, Redmond, WA (US)

(72) Inventors: Abhijit Chatterjee, Bellevue, WA (US); Sanjib Saha, Sammamish, WA (US); Neil Andrew Brench, Sammamish, WA (US); Jack Lee Miller, Seattle, WA (US); Mithun Sibi Thomas, Seattle, WA (US); Andrei V. Nagornyi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 16/234,147

(22) Filed: Dec. 27, 2018

(65) Prior Publication Data

US 2020/0210211 A1 Jul. 2, 2020

(51) Int. Cl.
*G06F 9/451* (2018.01)
*G06F 16/903* (2019.01)

(52) U.S. Cl.
CPC ........ *G06F 9/451* (2018.02); *G06F 16/90344* (2019.01)

(58) Field of Classification Search
CPC .......... G06F 9/451; G06F 9/454; G06F 9/452; G06F 16/90344; G06F 8/20; G06F 8/38
See application file for complete search history.

(56) References Cited

U.S. PATENT DOCUMENTS 5,369,778 A * 11/1994 San Soucie ............. G06F 9/543
5,600,778 A *  2/1997 Swanson ................. G06F 3/033
                                                    715/762

(Continued)

FOREIGN PATENT DOCUMENTS

WO      2015064983 A1    5/2015

OTHER PUBLICATIONS

"International Search Report and Written Opinion Issued in PCT Application No. PCT/US2019/067697", dated Apr. 24, 2020, 13 Pages.

(Continued)

*Primary Examiner* — Jeremy L Stanley
(74) *Attorney, Agent, or Firm* — Michael Best & Friedrich LLP

(57) ABSTRACT

A method for personalizing resource strings within a user interface of a computing device. The method includes accessing a personalization editor via the computing device, and receiving a user modification to a resource string associated with one or more applications. The method also includes storing an original unmodified resource string associated with the resource string, the modified resource string, and the associated applications. The method also includes receiving a request from a first application for a first resource string associated with a specified resource identifier. The method also includes determining if the first resource string has an associated modified resource string stored in the personalized resource string database, and displaying the modified resource string based on the first resource string being determined to be associated with the modified resource string stored in the personalized resource string database.

20 Claims, 5 Drawing Sheets

(56) References Cited

U.S. PATENT DOCUMENTS

| | | | | |
|---|---|---|---|---|
| 5,603,034 | A * | 2/1997 | Swanson | G06F 9/452 717/111 |
| 5,678,039 | A * | 10/1997 | Hinks | G06F 9/454 |
| 6,035,121 | A * | 3/2000 | Chiu | G06F 9/454 717/141 |
| 7,257,527 | B2 * | 8/2007 | Ertemalp | G06F 9/454 704/2 |
| 7,509,318 | B2 * | 3/2009 | Shaath | G06F 9/454 |
| 7,729,900 | B2 * | 6/2010 | Moore | G06F 9/454 704/9 |
| 7,949,670 | B2 * | 5/2011 | Sudhakar | G06F 11/3692 707/761 |
| 7,987,087 | B2 * | 7/2011 | Rich | G06F 40/58 704/2 |
| 8,140,108 | B2 * | 3/2012 | Ang | H04M 1/72561 455/550.1 |
| 8,170,864 | B2 * | 5/2012 | Huang | G06F 9/454 704/8 |
| 8,307,349 | B2 * | 11/2012 | Ishimoto | G06F 9/454 717/136 |
| 8,438,007 | B1 * | 5/2013 | Hokari | G06F 9/454 704/8 |
| 8,510,096 | B2 * | 8/2013 | Jia | G06F 9/454 704/8 |
| 8,671,389 | B1 * | 3/2014 | Buryak | G06F 9/454 717/109 |
| 8,776,031 | B1 * | 7/2014 | Goodwin | G06F 9/44521 717/139 |
| 8,825,692 | B1 * | 9/2014 | Telnov | G06F 9/454 707/760 |
| 8,928,591 | B2 * | 1/2015 | Swartz | G06F 3/0237 345/168 |
| 9,195,936 | B1 * | 11/2015 | Chase | G06N 5/025 |
| 9,582,294 | B1 * | 2/2017 | Self | G06F 9/454 |
| 9,690,549 | B2 * | 6/2017 | Zaiwei | G06F 3/033 |
| 10,282,174 | B2 * | 5/2019 | Chang | G06F 9/454 |
| 2003/0191817 | A1 * | 10/2003 | Fidler | G06F 40/174 709/219 |
| 2004/0015343 | A1 * | 1/2004 | Nakayama | G06F 9/454 704/8 |
| 2004/0268311 | A1 * | 12/2004 | Pizzoli | G06F 9/451 717/124 |
| 2005/0076306 | A1 * | 4/2005 | Martin | G06F 9/451 715/747 |
| 2006/0080358 | A1 * | 4/2006 | Blair-Stanek | G06F 9/454 |
| 2006/0116864 | A1 * | 6/2006 | McHugh | G06F 40/106 704/2 |
| 2006/0130026 | A1 * | 6/2006 | McHugh | G06F 40/40 717/141 |
| 2006/0173840 | A1 * | 8/2006 | Shaath | G06F 9/454 |
| 2006/0287844 | A1 * | 12/2006 | Rich | G06F 9/454 704/2 |
| 2007/0244691 | A1 * | 10/2007 | Alwan | G06F 40/40 704/8 |
| 2007/0250509 | A1 * | 10/2007 | Marti | G06F 40/211 |
| 2007/0260584 | A1 * | 11/2007 | Marti | G06F 16/258 |
| 2008/0133216 | A1 * | 6/2008 | Togami | G06F 9/454 704/4 |
| 2009/0089263 | A1 * | 4/2009 | McHugh | G06F 40/40 |
| 2009/0222787 | A1 * | 9/2009 | Aldahleh | G06F 9/454 717/101 |
| 2010/0031235 | A1 * | 2/2010 | Volkov | G06F 8/51 717/120 |
| 2010/0042929 | A1 * | 2/2010 | Berry | G06F 11/3692 715/738 |
| 2010/0088695 | A1 * | 4/2010 | Kakinari | G06F 9/454 717/178 |
| 2011/0119651 | A1 * | 5/2011 | Utschig-Utschig | G06F 8/35 717/107 |
| 2011/0119676 | A1 * | 5/2011 | Gallant | G06F 9/454 718/104 |
| 2011/0126098 | A1 * | 5/2011 | Jellison, Jr. | G06F 40/40 715/703 |
| 2011/0264440 | A1 * | 10/2011 | Zhou | G06F 40/58 704/8 |
| 2012/0167111 | A1 * | 6/2012 | Fortune | G06F 16/81 718/104 |
| 2012/0290284 | A1 * | 11/2012 | Aryattawanich | G06F 40/55 704/2 |
| 2013/0111460 | A1 * | 5/2013 | Mohamed | G06F 8/61 717/172 |
| 2013/0227522 | A1 * | 8/2013 | Lerum | G06F 9/44 717/120 |
| 2013/0339870 | A1 * | 12/2013 | Tandra Sishtla | G06F 9/454 715/744 |
| 2014/0006768 | A1 * | 1/2014 | Carter | G06F 8/33 713/100 |
| 2014/0123039 | A1 * | 5/2014 | Ozer | G06F 9/454 715/762 |
| 2015/0161160 | A1 * | 6/2015 | Chen | G06F 9/454 707/639 |
| 2016/0203151 | A1 * | 7/2016 | Burukhin | G06F 16/137 707/693 |
| 2016/0350108 | A1 * | 12/2016 | Joo | G06F 40/47 |
| 2017/0344227 | A1 * | 11/2017 | Stoicov | G06F 40/166 |
| 2019/0056961 | A1 * | 2/2019 | Dimov | G06F 16/958 |
| 2019/0057072 | A1 * | 2/2019 | Wang | G06F 40/169 |
| 2020/0110597 | A1 * | 4/2020 | Comer | G06F 9/454 |

OTHER PUBLICATIONS

"Dothraki", Retrieved from https://www.facebook.com/dothraki/?ref=br_rs, Retrieved on: Mar. 13, 2019, 8 Pages.

"Download Unofficial Windows 8 Language Packs", Retrieved from https://web.archive.org/web/20111114201111/https://www.ghacks.net/2011/11/12/download-unofficial-windows-8-language-packs/, Nov. 14, 2011, 6 Pages.

"IsoBuster—The Ultimate Data Recovery Software!", Retrieved https://web.archive.org/web/20160328113858/https://www.isobuster.com/translations.php, Mar. 28, 2016, 1 Page.

"Klingon Language Institute", Retrieved from https://www.facebook.com/klingonlanguageinstitute, Retrieved on: Mar. 13, 2019, 3 Pages.

"Learn Elvish", Retrieved from https://www.facebook.com/learnElvish/, Retrieved on: Mar. 13, 2019, 6 Pages.

"List of languages by number of native speakers", Retrieved from https://en.wikipedia.org/wiki/List_of_languages_by_number_of_native_speakers, Aug. 20, 2018, 9 Pages.

"Locale Setting—Set locale language for Android", Retrieved from https://play.google.com/store/apps/details?id=wio.my.locale&hl=en_IN, Oct. 4, 2018, 2 Pages.

Jiri, Trasak "Czech language pack for Winamp 5.5.3.1924", Retrieved from https://winampheritage.com/plugin/czech-language-pack-553/215267, Mar. 28, 2008, 2 Pages.

* cited by examiner

PERSONALIZATION OF RESOURCE STRINGS IN A COMPUTING DEVICE

SUMMARY

The use of personal computing devices by a large population of the world has created the need for enabling different users to modify and personalize their experiences when interfacing with the personal computing device. Currently, personalization of applications used in conjunction with personal computing devices is generally limited to cosmetic features. For example, a user may be able to modify certain features such as color schemes, wallpapers, themes, ringtones, etc. These personalizations can make a user feel more connected to a device.

While a user can personalize the cosmetic features for many applications on a computing device, there is very little or no ability for the end user to personalize the display texts of the various application user interfaces. For example, a user may want to see a different translated text string, other than what is displayed by a specific application. The user may consider that the more personalized string is "better" from the perspective of the user. Or, a user may simply want to customize the text strings to match their conversational style. For example, instead of the string reading as "The File is saved successfully on the removable device," the string can be customized to instead show "John, your file is good to go!" Currently, unless a specific application explicitly supports such "message customization features," there is no safe or easy way to customize text within an application. The primary reason is that text and other resources are generally an integral part of the application itself, rather than being customizable. To have each individual application be configured to support customization of their respective display texts would require substantially higher software development effort, more memory, and processing resources to be allocated to the application, making them neither viable nor practical solutions.

Thus, there is a need to remove the burden of implementation of text personalization from vendors and developers of applications, and to provide customizable text functions that can be extended to all applications (or a subset thereof) on a computing device without requiring any changes from the application provider/vendor. In other words, the functionality must exist as part of the computing device operating system, or as a part of the lower-level software development platform API set used to develop the application. This can allow for a user to customize text within an application on a computing device without requiring additional functionality to be added by the application developer/vendor.

For example, one embodiment provides a method for personalizing resource string within a user interface of a computing device. The method includes accessing a personalization editor via the computing device. The method further includes receiving via the personalization editor on the computing device, a user modification to a resource string associated with one or more applications. The method also includes storing, in a personalized resource string database, an original unmodified resource string associated with the resource string, the modified resource string, and the one or more applications associated with the modified resource string. The method also includes receiving a request from a first application of the one or more applications at the computing device for a first resource string associated with a specified resource identifier, wherein the first resource string and the associated resource identifier are stored in an application language resource file. The method also includes determining, via the computing device, if the first resource string has an associated modified resource string stored in the personalized resource string database. Finally, the method includes displaying, via the computing device, the modified resource string based on the first resource string being determined to be associated with the modified resource string stored in the personalized resource string database.

A further embodiment provides a system for providing personalized resource strings in a number of applications, the system including a computing device. The computing device includes a user interface, a communication interface, a memory for storing executable program code, and one or more electronic processors, functionally coupled to the memory and the user interface. The one or more electronic processors are configured to access a personalization and receive an input via the user interface indicating a desired user modification to a resource string associated with the one or more applications of the plurality of applications. The processors are further configured to store the original unmodified resource string corresponding to the modified resource string, the modified resource string and the one or more applications in a personalized resource string database. The processors are further configured to receive a request from a first application for a first resource string, wherein the first resource string is stored in an application language resource file, and determine if the first resource string has an associated modified resource string stored in the personalized resource string database. The processors are further configured to display the modified resource string on the user interface based on the first resource string being determined to have an associated modified resource string stored in the personalized resource string database.

A further embodiment provides a method for personalizing resource strings within a user interface of a computing device. The method includes accessing a personalization editor via the computing device. The method further includes receiving, via the personalization editor on the computing device, a user modification to a resource string associated with an application, and storing the modified resource string in a personalized resource string database. The method also includes receiving a request from the application at the computing device, for a first resource string, wherein the first resource string is stored in an application language resource file, and determining, via the computing device, the modified resource string based on the first resource string being determined to have an associated modified resource string stored in the personalized resource string database. The method also includes displaying, via the computing device, the modified resource string based on the first resource string being determined to have an associated modified resource string stored in the personalized resource string database, and displaying, via the computing device, the first resource string based on the first resource string being determined to not have an associated modified resource string stored in the personalized resource string database.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Complex software systems often include many source code resources that, through compilation, linking, and/or runtime actions, are loaded into memory and displayed via user interfaces. Typically, resources in a software project are isolated into resource files wherein resources are included and referenced or indexed by resource identifiers. The source code files in the software project may include resources by referencing the necessary resource identifiers. For example, most inputs (for example, text boxes, radio buttons, checkboxes, dropdown lists, list boxes, buttons, toggles, etc.) and informational components (for example, tooltips, icons, progress bars, notifications, message boxes, modal windows, etc.) in a graphical user interface (GUI) have a label property. The source code may then assign a resource identifier to an instance of the input or informational component. The resource identifier may point to a localized resource string, e.g., "hello world." Thus, when the source code is compiled and executed, the input and/or informational component is displayed with the "hello world" label. Using this layer of indirection for resources, it is possible to change the locale, language, or general text for the resources of a software project. The following embodiments describe systems and methods for using indirection schemes to allow for a user to customize resource strings to reflect preferential label texts on portions of an application, such as the inputs and/or informational components.

Figure 1:
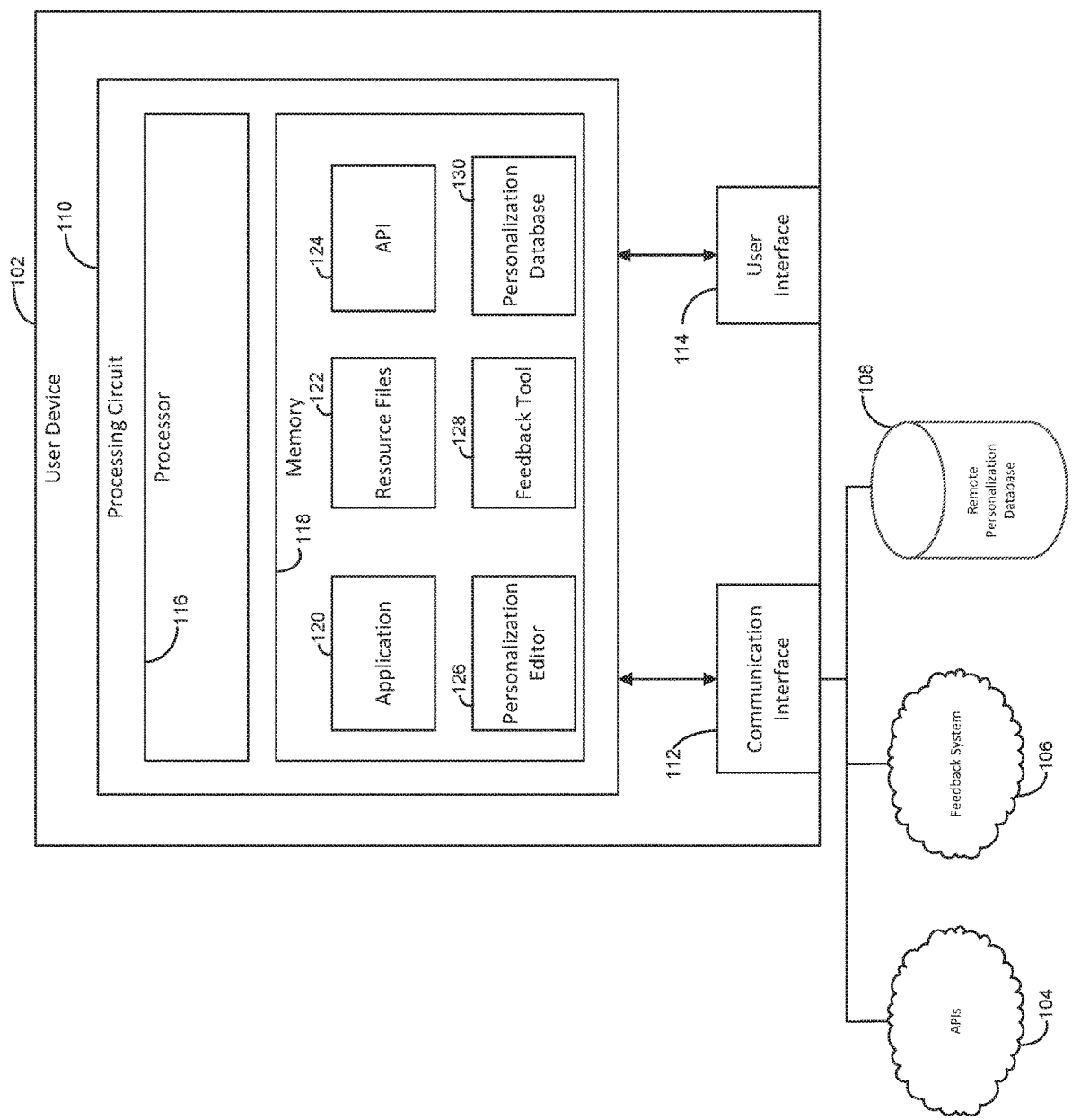
FIG. 1 is a block diagram of a system for accessing and modifying resource strings, according to some embodiments.

Turning to FIG. 1, an example system 100 for modifying resource strings is shown. In the example illustrated, the system 100 includes a user device 102, one or more remote Application Program Interfaces (API) 104, a feedback system 106, and a remote personalization database 108.

The user device 102 may be a personal computer, a laptop computer, a tablet computer, a mobile device such as a smartphone, a dedicated purpose computing device, etc. As shown in FIG. 1, the user device 102 includes a processing circuit 110, a communication interface 112, and a user interface 114. The processing circuit 110 includes an electronic processor 116 and a memory 118. The processing circuit 110 may be communicably connected to one or more of the communication interface 112 and the user interface 114. The electronic processor 116 may be implemented as a programmed microprocessor, an application specific integrated circuit (ASIC), one or more field programmable gate arrays (FPGA), a group of processing components, or with other suitable electronic processing components.

The memory 118 (for example, a non-transitory, computer-readable medium) includes one or more devices (for example, RAM, ROM, Flash memory, hard disk storage, etc.) for storing data and/or computer code for completing or facilitating the various processes, layers, and modules described herein. The memory 118 may include database components, object code components, script components, or other types of code and information for supporting the various activities and information structure described in the present application. According to one example, the memory 118 is communicably connected to the electronic processor 116 via the processing circuit 110 and may include computer code for executing (for example, by the processing circuit 110 and/or the electronic processor 116) one or more processes described herein.

The communication interface 112 is configured to facilitate communication between the user device 102 and one or more external devices or systems, such as the remote APIs 104, the feedback system 106, and/or the remote personalization database 108. The communication interface 112 may be or include wireless communication interfaces (for example, antennas, transmitters, receivers, transceivers, etc.) for conducting data communications between the user device 102 and one or more external devices or systems, such as those described above. In some embodiments, the communication interface 112 utilizes one or more wireless communication protocols, such as cellular (3G, 4G, 5G, LTE, CDMA, etc.), Wi-Fi, Wi-MAX, ZigBee, ZigBee Pro, Bluetooth, Bluetooth Low Energy (BLE), RF, LoRa, LoRaWAN, Near Field Communication (NFC), Z-wave, 6LoWPAN, Thread, WiFi-ah, and/or other wireless communication protocols. The communication interface 112 may additionally be or include wired communication interfaces to facilitate wired communication between the user device 102 and one or more other devices, such as those described above. The wired communication interfaces may be or include jacks, wire terminals, ports, etc. for conducting data communications between the user device 102 and one or more external devices. The communication interface 112 may include wired interfaces such as Universal Serial Bus (USB) interfaces, USB-C interfaces, Firewire interfaces, CAT5 interfaces, universal asynchronous receiver/transmitter (UART) interfaces, serial (RS-232, RS-485), fiber optic interface, etc.

The user interface 114 may allow for a user to provide inputs to the user device 102. For example, the user interface 114 may include a keyboard, a mouse, a trackpad, a touchscreen (for example, resistive, capacitive, inductive, etc.), or other known input mechanism. The user interface 114 may further provide a display to allow a user to view various data provided by the user device 102. The user interface 114 may further be configured to provide a display of a graphical user interface ("GUI"), which may be used by a user to provide inputs to the user interface 114, as well as display certain data to the user.

As described above, the memory 118 may be configured to store various processes, layers, and modules, which may be executed by the electronic processor 116 and/or the processing circuit 110. In one embodiment, the memory 118 may include one or more applications 120, one or more resource files 122, one or more APIs 124, a personalization editor 126, a feedback tool 128, and a personalization database 130. The applications 120 may be stand-alone compiled applications for execution on the user device 102. The applications 120 may be configured to run within a specific operating system (e.g. Microsoft Windows). Further, the applications 120 may be configured to be displayed on a GUI of the user interface 114.

Figure 2:
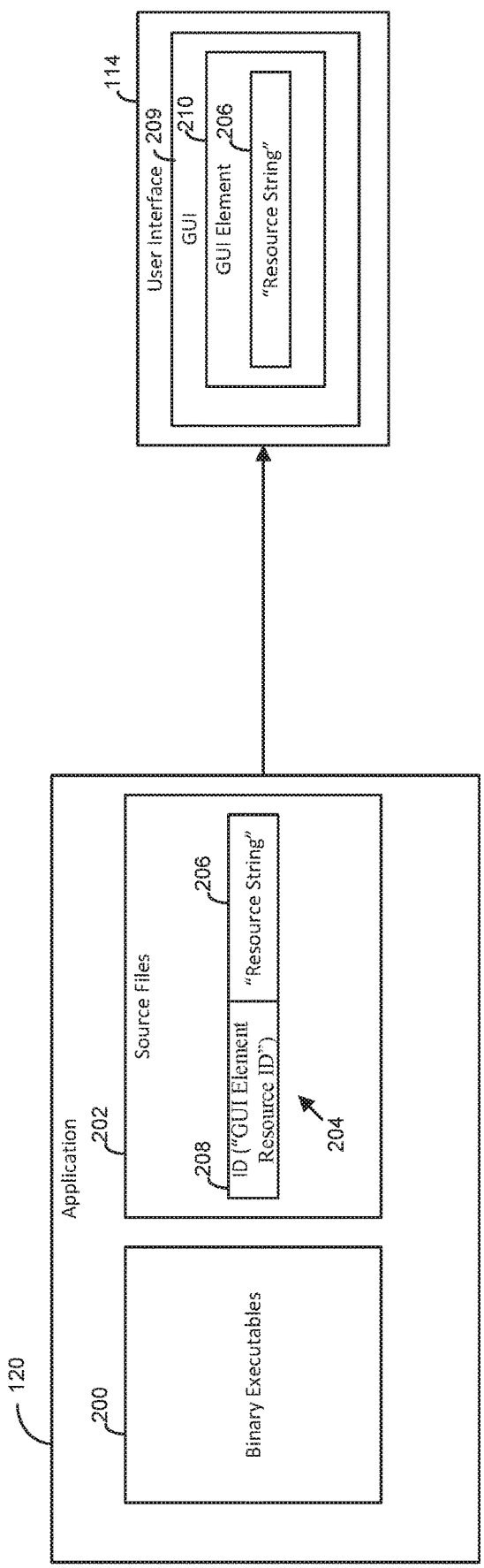
FIG. 2 is a block diagram illustrating a structure of an application and an interface to a user interface.

Turning briefly to FIG. 2, a block diagram illustrating an example structure of the application 120 and an interface with the user interface 114 is shown, according to some embodiments. The applications 120 include binary executable files 200 and source files 202. The binary executable files 200 may include dynamically linked libraries, direct executable files, etc. The binary executable files 200 may be pre-compiled machine code, just-in-time compiled bytecode, or the like. In one embodiment, the binary executable files 200 are compiled from the source files 202. The source files 202 may include programming language source code as well as resource files 204. The resource files 204 may be configured to associate resource strings with respective resource identifiers (resource IDs). For example, as shown in FIG. 2, a resource string 206 corresponds to a resource ID 208. The source files 202 may include source code to instantiate a graphical user interface (GUI) 209 within the user interface 114 and reference the resource ID 208 to assign the corresponding resource string 206 to a GUI element 210 within the GUI 209. In some examples, the resource ID 208 may be expressed in a textual format such as "GUI Element Resource ID." However, other applicable formats for the resource ID 208 are also contemplated. When the source code within the source files 202 is compiled, the resource ID 208 is embedded in one of the binary executable files 200. Upon execution of the binary executable files 200, a runtime environment reads the resource ID 208, accesses the corresponding resource files 204, obtains the corresponding resource string 206 based on the resource ID 208, and displays the resource string 206 in the GUI element 210.

Returning now to FIG. 1, the memory 118 is shown to also include resource files 122. The resource files 122 may be similar to the resource files 204 described above. As described above, the resource files 122 are configured to associate resources with respective resource identifiers. The resource files 122 may include one or more resource strings, which may be used to display text within the application 120.

The APIs 124 may be used to interface with one or more applications or programs with other applications or programs. For example, the APIs 124 may include rendering APIs which can be configured to render a GUI within the user interface 114. The rendering APIs may further be in communication with the application 120, and can be used to render a GUI and one or more GUI elements, such as those described above, based on instructions provided by the application 120. The APIs 124 may further include resource technology APIs. The resource technology APIs may be configured to provide an interface between a personalized text database, such as personalization database 108, and the application 120. For example, the resource technology APIs may be configured to consult the personalization database 108 when the application 120 attempts to retrieve localized text associated with a specific resource symbolic name and the application-supplied localized text is retrieved from the application's 120 localized files, and determine if there is a possible match for the application-supplied localized text in the personalization database 108. This process will be described in more detail below. Other APIs 124 can provide interfacing between one or more programs or modules in the memory 118, and between the one or more programs or modules in the memory 208 and one or more external programs or systems, such as the feedback system 106 and/or personalization database 108.

The personalization editor 126 may be configured to capture user preferences of resource strings against the resource strings that were originally shipped with an application, such as application 120 and/or resource files 122. The personalization editor 126 may interface with the user interface 114 to allow the user to specify one or more existing resource strings associated with an application, and input a preferred substitute resource string. In some embodiments, the personalization editor 126 is in communication with the remote personalization database 108, which can be configured to store the user preferred substitute resource strings. In some embodiments, the personalization editor 126 may communicate with the remote personalization database 108 directly, via the communication interface 112. In other embodiments, the personalization editor 126 may be in communication with the remote personalization database 108 and/or the application 120 via one or more APIs, such as remote APIs 104 and/or APIs 124. While shown in the memory 118, it is contemplated that the personalization editor 126 may be located on a remote server, and interface with the user device 102 via the communication interface 112. In some embodiments, the personalization editor is in communication with the personalization database 130 stored in the memory 118, and described below.

In one embodiment, the feedback tool 128 is configured to be used to enable pinpoint identification of resources displayed in user interfaces. The feedback tool 128 may be a distinct application started manually by a user, via the user device 102. The feedback tool 128 may be configured to be able to work with any arbitrary code or application that executes on the user device 102, and displays via the user interface 114. In one embodiment, the feedback tool 128 may be thought of as interactive instrumentation layered on top of the user interface 114, or, more specifically a GUI within the user interface 114. The feedback tool 128 may have one or more control features, such as a toolbar, popup menu, etc., to enable a user to control the behavior of the feedback tool 128 via the user interface 114. For example, start/stop buttons may activate or deactivate the feedback tool 128. While active, the feedback tool 128 may include a mechanism to enable the user to manually select or target a displayed resource string. While the feedback tool 128 is active, a resource may be targeted by directing a pointer input (e.g. mouse input) to a resource string. Selection of a resource string may trigger display, via the user interface 114, of a feedback input control function (for example, a text control) into which user feedback may be inputted via the user interface 114. In one embodiment, properties of the feedback may also be inputted. For example, if the feedback is a proposed translation of a resource string, the feedback tool 128 may include an interactive control to set the language of the feedback. In one embodiment, the feedback tool 128 may be configured to perform the same functions as the personalization editor 126. In this embodiment, the feedback tool 128 can perform the function of storing the original resource string and the corresponding user-preferred substitute string in the personalization database, as described above. Accordingly, the feedback tool 128 may be configured to perform the functions of the feedback tool 128 described above, as well as the functions of the above described personalization editor 126.

The personalization database 130 may be configured to be populated and maintained based on data received from the personalization editor 126. While shown as internal to the user device 102, it is contemplated that in some embodiments, the personalization database 130 may be external to the user device 102, such as the remote personalization database 108. In further embodiments, the personalization editor 126 may provide personalization data to both the personalization database 130 and the remote personalization database 108. In one embodiment, the personalization database 130 is a persisted database that may contain a set of original resource strings and suggested substitute resource strings received via the personalization editor 126. For each substitute string, the personalization database 130 can capture and store additional metadata such as the application associated with the suggested substitute resource string, whether the suggested substitute resource string should be global or only for a specific associated application, etc. In some embodiments, the personalization database 130 is cached using a hash based on the original string to allow for faster retrieval.

The feedback tool 128 may also capture context metadata. For example, in some runtime environments, resources are loaded during execution without the ready availability of the source-level references used to compile the code using the resources. Therefore, to enable identification of a resource string in terms of its associated source code (or resource file) and hence revision or augmentation of the resource, context metadata is captured during execution and then used to infer the identity of the resource. While shown as stored in the memory 118, it is contemplated that the feedback tool 128 may be located remotely, such as on a cloud-based server, and accessed via the communication interface 112.

The remote APIs 104 may be used to interface one or more applications or programs with other applications or programs. For example, the remote APIs 104 may include rendering APIs which can be configured to render a GUI within the user interface 114. The rendering APIs may further be in communication with the application 120, and can be used to render a GUI and one or more GUI elements, such as those described above, based on instructions provided by the application 120. The remote APIs 104 may further include resource technology APIs. The resource technology APIs may be configured to provide an interface between a personalized text database, such as personalization database 108, and the application 120. For example, the resource technology APIs may be configured to consult the personalization database 108 when the application 120 attempts to retrieve localized text associated with a specific resource symbolic name and the localized text is retrieved from the application's 120 localized files, and determine if there is a possible match in the personalization database 108. This process will be described in more detail below. Other remote APIs 104 can provide interfacing between one or more programs or modules in the memory 118, and between the one or more programs or modules in the memory 118 and one or more external programs or systems, such as the feedback system 106 and/or personalization database 108.

The feedback system 106 may be a repository to store feedback received from the feedback tool 128. In some embodiments, the feedback system 106 can store feedback received from multiple feedback tools associated with one or more applications. The feedback system 106 may be a client side system which allows the developer or owner of an application to review feedback provided from one or more feedback tools 128. In some embodiments, the feedback system 106 can allow for multiple users to approve or validate feedback data provided from one or more feedback tools 128. In some embodiments, the feedback system 106 is configured to push one or more changes to an application 120, based on the received feedback. For example, the feedback system 106 may evaluate the number and consistency of specific feedback data before pushing a change to an application. In other embodiments, the feedback system 106 may push a change to an application where the feedback data has been validated by a certain number of users within the feedback system 106. Such a change will require a developer/vendor of the application to incorporate the feedback permanently and make the change effective by providing updated application resource files 122.

As described above, the remote personalization database 108 may be configured to be populated and maintained based on data received from the personalization editor 126. In one embodiment, the remote personalization database 108 is a persisted database that may contain a set of original resource strings and suggested substitute resource strings received via the personalization editor 126. For each substitute string, the personalization database 108 can capture and store additional metadata such as the application associated with the suggested substitute resource string, whether the suggested substitute resource string should be global or only for a specific application, etc. In some embodiments, the personalization database 108 is cached using a hash based on the original string to allow for faster retrieval.

Figure 3:
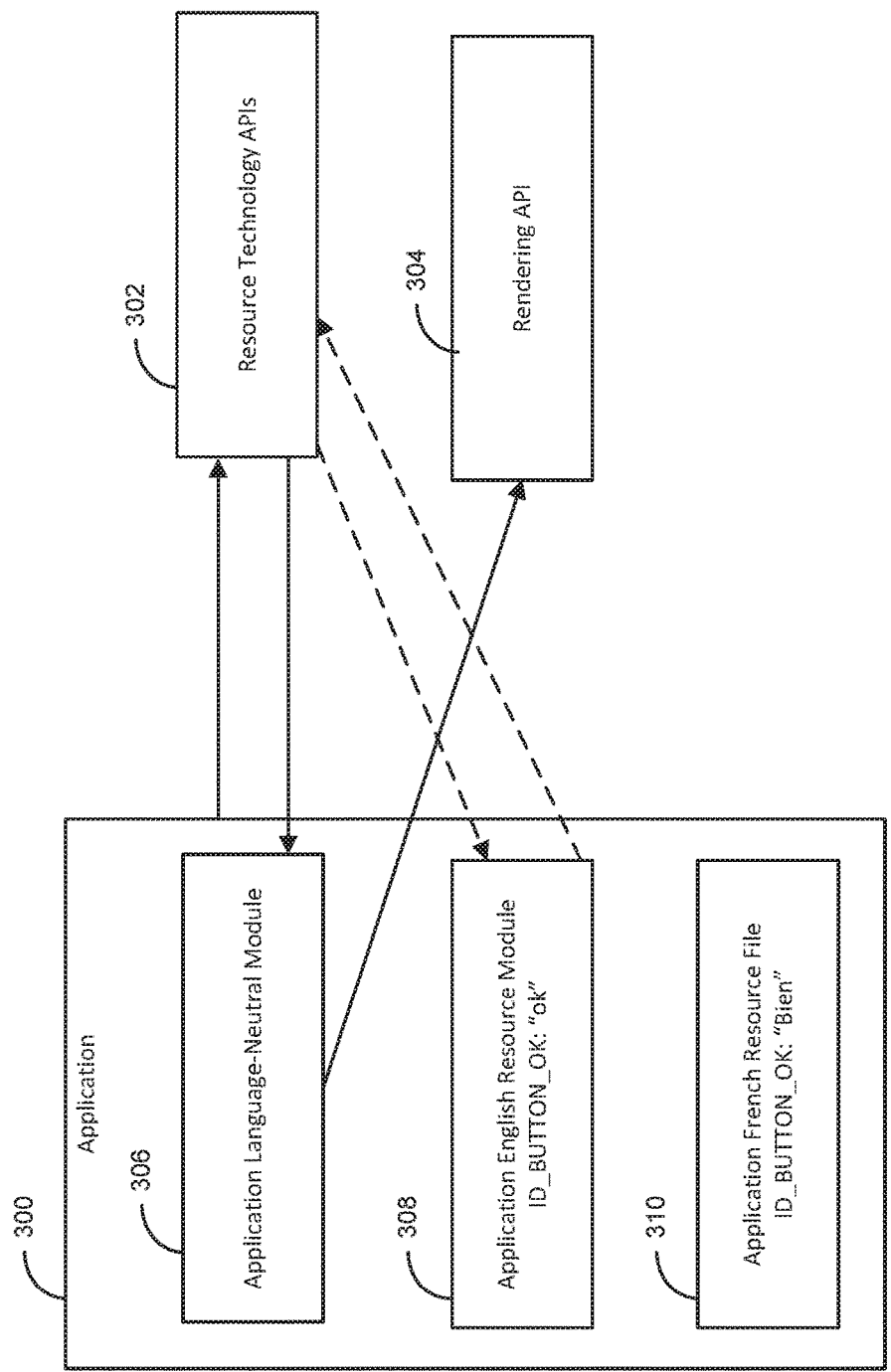
FIG. 3 is a block diagram of a system for accessing resource strings for use by an application.

Turning now to FIG. 3, a process diagram showing a system for displaying resource strings associated with different languages using predefined language resource files is shown, according to some embodiments. An application 300 is shown in communication with one or more resource technology APIs 302 and a rendering API 304, which may be similar to those described above. The application 300 may include a language neutral-module 306, as well as language-specific modules, such as an English resource module 308 and a French resource module 310. The language-neutral module 306 and language-specific modules 308, 310 of the application 300 are "logically" separate. Accordingly, the language-neutral module 306 and language-specific modules 308, 310 may be stored in "physically separate" modules, e.g. in different application binary/modules. However, in other embodiments, the language-neutral module 306 and language-specific modules 308, 310 may be located within the same application binary/module.

Within the application 300, display resource items such as menu items, button-text, etc., are typically associated with a resource symbolic name (e.g., ID_BUTTON_OK). The language-neutral modules, such as language-neutral module 306, within the application 300 refer to such resources through the symbolic resource name or the resource ID. The language-specific modules 308, 310 of the application 300 may associate a symbolic resource to the actual localized text. For example, an English resource file of the application may have an associated resource string of "Ok" associated with a symbolic resource name ID_BUTTON_OK. Thus, to render "Ok" on the button within the application 300 in English language, the following steps are completed. The steps may either be done explicitly by the application code, or the user-interface framework used by the application.

First, an OS/platform API is instructed to load the resource text for the button via the following instruction: string OKButtonText=GetResourceText (Applicationid, ID_BUTTON_OK). The API is required to know which application (specified either implicitly or explicitly) and the resource identification (the symbolic name or ID). The API then returns a text that was shipped with the localized application by first communicating with the associated resource module. Here, the resource module is the English resource module 308. Accordingly, the English term "Ok" is returned by the resource technology API 302 to the Application 300. A second command, "DisplayButton (OkButtonText)," where "OkButtonText" is "Ok," then instructs the returned string "Ok" to be loaded as text on a GUI, via the rendering API 304. While the above steps are only "conceptually" separate, they may be performed in a single step as well, depending on the OS/platform on which the Application 300 is running. The call that is made to the underlying platform (e.g. the resource technology API 302 to the associated language-specific module 308, 310) which then returns the desired resource string is an indirection that makes it possible to intercept and substitute the original string with a personalized string without requiring any change to the application itself. This will be described in more detail in FIG. 4, described below.

Figure 4:
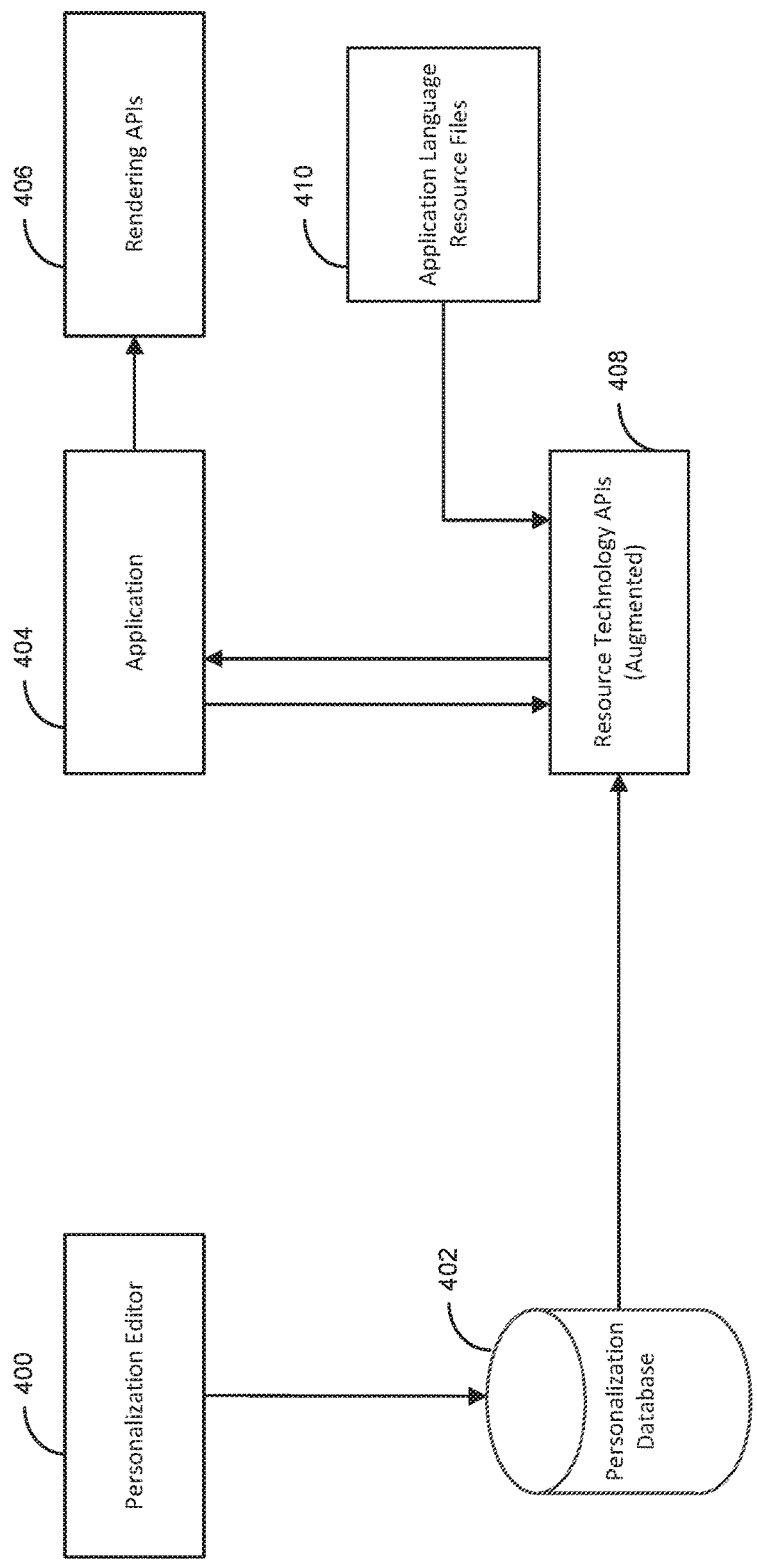
FIG. 4 is a block diagram of a system for personalizing resource strings, according to some embodiments.

Turning now to FIG. 4, a process diagram showing a system for displaying personalized resource strings associated within a given application is shown, according to some embodiments. The system includes a personalization editor 400, a personalization database 402, an application 404, a rendering API 406, one or more resource technology APIs 408 and one or more application language resource files 410. The above components may be similar to those described in FIGS. 1, 2 and 3, described above.

During operation of the application 404, a user may utilize the personalization editor 400 to modify one or more resource strings associated with an application. The personalizations may be made to translate the resource strings into a language used by a user, or to simply change the resource string to recite different text in the same language. This can allow for the user to create a personalized environment based on their personal preferences. In some example, the user may use the personalization editor 400 to modify resource strings from one language, to a fictional language such as Klingon, Elvish, etc. The user can personalize the resource strings in any matter they see fit to personalize the application to their liking. The modified user-preferred strings are then sent to the personalization database 402 for storage and later access by the application 404 and one or more APIs, such as the resource technology APIs 408. The personalized resources strings are generally saved in the personalization database 402 as being associated with a specific (unmodified) resource string. For example, the personalized resource strings may be saved in the personalization database 402 and associated with specific (unmodified) resource string in such a manner that given a resource string, the personalization database 402 can be configured to determine if any user-preferred strings exist that correspond to the whole unmodified resource string, and, if so, retrieve the user-preferred string instead. The personalization database 402 can additionally be configured to determine if a user-preferred string is applicable for a specific application only, or for all eligible applications.

In some embodiments, the personalized resource strings can also be captured and transmitted to a feedback system, such as feedback system 106. For example, a user may capture the personalized or modified resource strings using a translation feedback tool, such as feedback tool 128, described above. The personalized resource strings may then be evaluated by the feedback system for possible integration into the application 404. In some embodiments, the user may provide feedback information along with the personalized resource strings, such as via the feedback tool 128, described above. The feedback information may include information regarding whether the modified resource strings were based on a personal preference, or were a better translation than currently used in the application 404. This information can be used by the feedback system 106 to consider permanently modifying the resource string. In some embodiments, the feedback system 106 validates the modified resource string based on the feedback information, existing feedback data, and feedback from developers or community members. If the feedback system 106 validates the modified resource string, the resource string may be permanently modified by the application developer/vendor in one or more language-specific modules within the application language resource files 410, and the modified application language resource files 410 can subsequently made available to the user device 102.

Upon executing the application 404, the application 404 calls into the one or more resource technology APIs 408 in order to retrieve the localized texts for display by the application 404. The application 404 may use direct or indirect calls into the resource technology APIs 408. Upon receiving the calls, the resource technology APIs 408 may perform the appropriate personalization of the associated resource strings, and return either the original strings or the personalized resource strings to the application 404. The resource technology APIs 408 are configured to consult the personalization database 402 when the application 404 calls into the resource technology API 408 for retrieving a resource string for a specific resource symbolic name or resource ID from the application language resource files 410. Specifically, the resource technology APIs 408 are configured to first determine if the application 404 is implicitly or explicitly eligible for participating in the personalization experience, and if so, determine if a personalized resource string exists in the personalization database 402 that is associated with the original, unmodified application resource string requested by the application 404. If a personalized resource string associated with the original, unmodified application resource string is found in the personalization database 402 by the resource technology APIs 408, the resource technology APIs 408 return the personalized resource string to the application 404, which then displays the personalized resource string via the rendering APIs 406. If a personalized resource string does not exist, or if certain constraints are in place (e.g., the application 404 is ineligible for personalization because it is a mission-critical application, or the personalized text was solely intended for a different application), the original resource string from the application language resource files 410 is returned to the application 404 for display via the rendering APIs 406. As the resource technology APIs 408 provide either the modified resource string or the default resource string to the application 404, the application 404 is oblivious to what resource strings are being returned, and thus the application 404 does not need to be modified to utilize the personalized resource strings.

Figure 5:
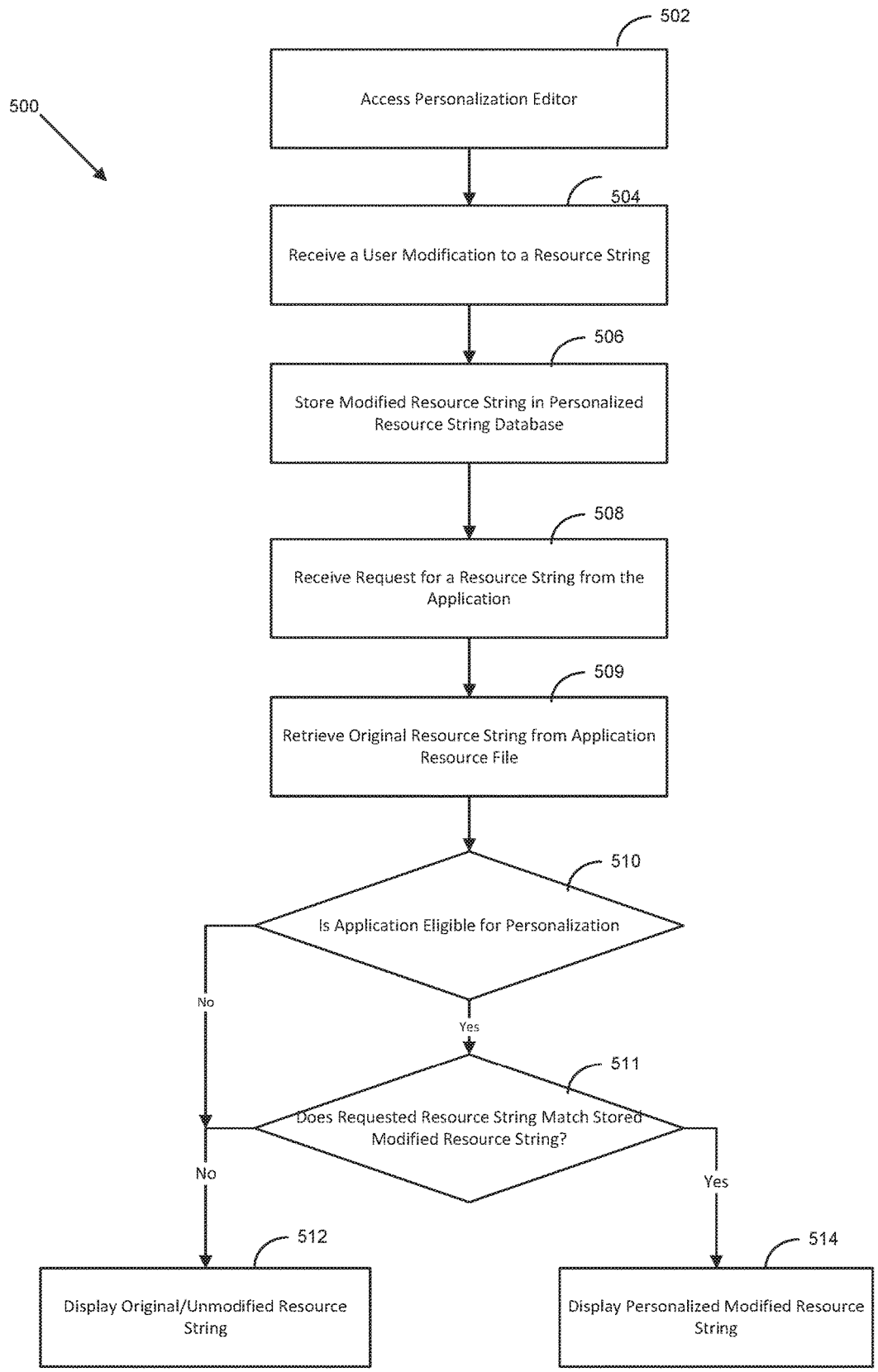
FIG. 5 is a flow chart illustrating a process for personalizing resource strings in an application, according to some embodiments.

Turning now to FIG. 5, a flow-chart illustrating a process 500 for displaying personalized resource strings within an application is shown, according to some embodiments. The process 500 may be executed using the systems and devices described above. At process block 502, a user accesses a personalization editor, such as the personalization editor 126 described above. The user then inputs a proposed modification to a resource string of the application, which is received by the user device 102 at process block 504. The proposed modification may be a change to a text resource string, such as a different translation or to change the wording within the same language, as described above.

At process block 506, the modified resource string is stored for later retrieval. In some embodiments, the modified resource string is stored in a personalized resource string database, such as personalization database 108, described above. The modified resource string may be stored in conjunction with the original resource string that was modified by the user, such that the unmodified resource string is used as an index value by the personalization database. In some embodiments, a resource string ID, such as resource string ID 208 may also be used as an index value by the personalization database. At process block 508, the application requests a resource string for display on a user interface or GUI by specifying the unique resource symbolic name/ID for the resource string. A process block 509, the original resource string, as identified by the specified resource ID/symbolic name, is retrieved from the application resource file. At process block 510, it is determined if the application is eligible for participating in the personalization process. If the application is determined to be eligible, the process 500 proceeds to process block 511. If the application is determined to not be eligible, the process proceeds to process block 512, and the original/unmodified resource string is displayed. In one example, the application may not be eligible because the application is a mission-control application, and cannot be modified. In some embodiments, applications that are eligible for participating in the personalization process 500 are specified within one or more components of the above systems and devices, such as the personalization database 108. If the application requesting a resource string for display at process block 508 is not one of the specified applications, the process 500 determines that the requesting application is ineligible at process block 510.

At process block 511 it is determined if the retrieved resource strings has a corresponding user-preferred substitute string in the personalization database. In one embodiment, the retrieved resource string is determined to correspond to a user-preferred substitute string where there is an exact and entire match between the retrieved resource string, and an original resource string associated with the user-preferred substitute string. As described above, the original resource string may be stored along with the user-preferred substitute string in the personalization database. In some examples, the retrieved resource string is determined to match a user-preferred substitute string based on matching a string identifier of the retrieved resource string with a string identifier of the user-preferred substitute string.

If it is determined at process block 511 that there is no stored modified resource string that matches the requested resource string, the unmodified requested resource string is provided to the application and displayed at process block 512. In some embodiments, the unmodified requested resource string is stored in an application language resource file, as described above. The application may display the unmodified requested resource string via one or more rendering APIs, as described above. If it is determined at process block 511 that there is a stored modified resource string that matches the requested resource string, but the stored modified string is for a specific application only, different than the requesting application in process block 508, the unmodified requested resource string is provided to the application and displayed at process block 512. Conversely, if it is determined at process block 511 that the stored modified resource string is applicable for all applications, or the modified resource string is specifically applicable for the requesting application, then the modified resource string is provided to the application and displayed at process block 514. The application may display the unmodified requested resource string via one or more rendering APIs.

The functional block diagrams, operational scenarios and sequences, and flow diagrams provided in the figures are representative of exemplary systems, environments, and methodologies for performing novel aspects of the disclosure. While, for purposes simplicity of explanation, methods included herein may be in the form of a functional diagram, operational scenario or sequence, or flow diagram and may be described as a series of acts, it is to be understood and appreciated that the methods are not limited by the order of acts, as some acts may, in accordance therewith, occur in a different order or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above.

The invention claimed is:

1. A method for personalizing resource strings within a user interface of a computing device, comprising:
   accessing, via the computing device, a personalization editor;
   receiving, via the personalization editor on the computing device, a user modification to modify a resource string, wherein the modified resource string is applied to a plurality of applications associated with the computing device;
   storing, in a personalized resource string database, an original unmodified resource string associated with the resource string, the modified resource string, and the plurality of applications to which the modified resource string is applied;
   receiving a request from a first application of the plurality of applications at the computing device for a first resource string associated with a specified resource identifier, wherein the first resource string and the associated resource identifier are stored in an application language resource file;
   determining, via the computing device, if the first resource string has an associated modified resource string stored in the personalized resource string database; and
   displaying, via the computing device, the modified resource string based on the first resource string being determined to be associated with the modified resource string stored in the personalized resource string database.

2. The method of claim 1, wherein the modified resource string is stored in the personalized resource string database along with an index value, and wherein the index value is the original unmodified resource string.

3. The method of claim 2, wherein determining if the first resource string has an associated modified resource string stored in the personalized resource string database comprises determining if the first resource string corresponds to the index value associated with the modified resource string.

4. The method of claim 1, further comprising:
   displaying, via the computing device, the first resource string based on the first resource string being determined to not be associated with any modified resource string stored in the personalized resource string database.

5. The method of claim 1, wherein the first resource string is determined to be associated with a modified resource string stored in the personalized resource string database based on the original unmodified resource string corresponding to the modified resource string being determined to match the first resource string.

6. The method of claim 5, wherein the first resource string and the original unmodified resource string from the personalized resource string database are determined to match based on an exact and entire comparison of the original unmodified resource string and the first resource string.

7. The method of claim 1, further comprising determining if the first application is eligible for personalization.

8. The method of claim 7, further comprising displaying the first resource string stored in the application language resource file based on the first application being determined to be ineligible for personalization.

9. The method of claim 7, wherein the application is determined to not be eligible for personalization based on the application being a mission-critical application.

10. The method of claim 1, further comprising displaying the first resource string based on the modified resource string from the personalized resource string database being determined to be inapplicable for the first application.

11. The method of claim 10, wherein the modified resource string is determined to be inapplicable for the first application based on the modified resource string being designated within the personalized resource string database to be applicable to select applications from the one or more applications, and wherein the select applications are different than the first application.

12. A system for providing personalized resource strings in a plurality of applications, the system comprising:
    a computing device, comprising:
        a user interface;
        a communication interface;
        a memory for storing executable program code; and
        one or more electronic processors, functionally coupled to the memory and the user interface, the one or more electronic processors configured to:
            access a personalization editor;
            receive an input via the user interface to modify a resource string, wherein the modified resource string is applied to the plurality of applications;
            store the original unmodified resource string corresponding to the modified resource string, the modified resource string, the plurality of applications to which the modified resource string is applied, and metadata indicating whether the modified resource string applies to the plurality of applications or is limited to one or more specific applications of the plurality of applications in a personalized resource string database;
            receive a request from a first application for a first resource string, wherein the first resource string is stored in an application language resource file;
            determine if the first resource string has an associated modified resource string stored in the personalized resource string database; and
            display the modified resource string on the user interface based on the first resource string being determined to have an associated modified resource string stored in the personalized resource string database.

13. The system of claim 12, wherein the computing device is in electronic communication with the personalized resource string database via the communication interface.

14. The system of claim 12, wherein the electronic processors are further configured to display the first resource string on the user interface based on the first resource string being determined to not have an associated modified resource string stored in the personalized resource string database.

15. The system of claim 12, wherein the electronic processors are further configured to determine if the first application is eligible for personalization.

16. The system of claim 14, wherein the electronic processors are further configured to display the first resource string stored in the application language resource file based on the application being determined to not be eligible for personalization.

17. The system of claim 12, wherein the first resource string is determined to have an associated modified resource string stored in the personalized resource string database based on the computing device determining that there is an exact and entire match between the first resource string and the original unmodified resource string corresponding to the modified resource string.

18. The system of claim 12, where the electronic processors are further configured to determine if the modified resource string is applicable for the first application.

19. The method of claim 18, wherein the electronic processors are further configured to display the first resource string based on the modified string being determined to not be applicable for the first application.

20. A method for personalizing resource strings within a user interface of a computing device, comprising:
    accessing, via the computing device, a personalization editor;
    receiving, via the personalization editor on the computing device, a user modification to modify a resource string, wherein the modified resource string is applied to a plurality of applications;
    storing, in a personalized resource string database, the modified resource string, and the plurality of applications to which the modified resource string is applied;
    receiving a request from a first application of the plurality of applications at the computing device, for a first resource string, wherein the first resource string is stored in an application language resource file;
    determining, via the computing device, if the first resource string has an associated modified resource string stored in the personalized resource string database;
    displaying, via the computing device, the modified resource string based on the first resource string being determined to have an associated modified resource string stored in the personalized resource string database; and
    displaying, via the computing device, the first resource string based on the first resource string being determined to not have an associated modified resource string stored in the personalized resource string database.

* * * * *